April 12, 1927.

A. A. SCOTT 1,624,629

INCUBATOR

Filed May 10, 1924

4 Sheets-Sheet 1

April 12, 1927. 1,624,629
A. A. SCOTT
INCUBATOR
Filed May 10, 1924  4 Sheets-Sheet 4

WITNESSES

Inventor
Aaron A. Scott
By
Attorney

Patented Apr. 12, 1927.

1,624,629

UNITED STATES PATENT OFFICE.

AARON A. SCOTT, OF TIGRETT, TENNESSEE.

INCUBATOR.

Application filed May 10, 1924. Serial No. 712,376.

This invention relates to egg hatching devices and the primary object of the invention is to provide an improved incubator embodying novel means for keeping the incubator at an even temperature at all times and to prevent the eggs from being subjected to a too great direct heat.

Another object of the invention is to provide a novel means for ventilating the incubator through the lower wall thereof and novel means for supplying moisture to the incubator, whereby the desired humidity in the egg hatchng chamber can be controlled.

A still further object of the invention is to provide an improved incubator of the above character, which will be durable and efficient in use, one that will be simple and easy to manufacture, and one which can be placed upon the market and operated at a minimum cost.

Figure 1:
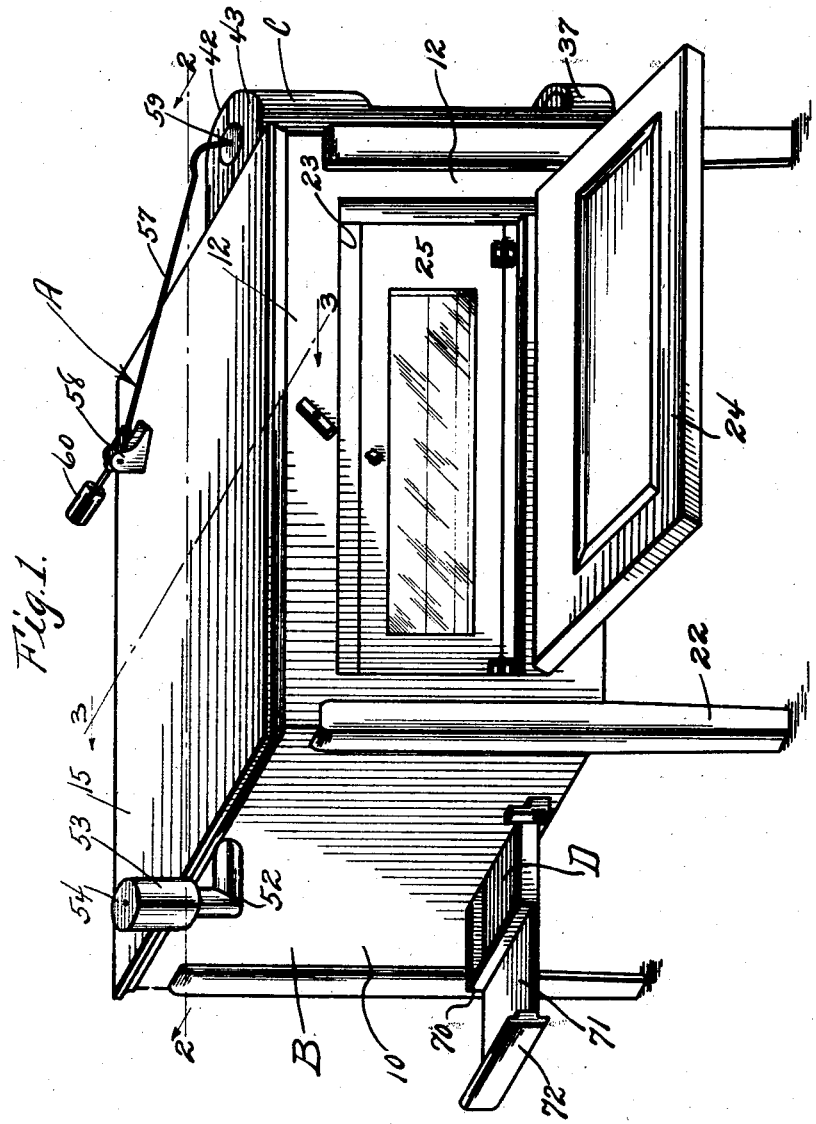
Figure 2:
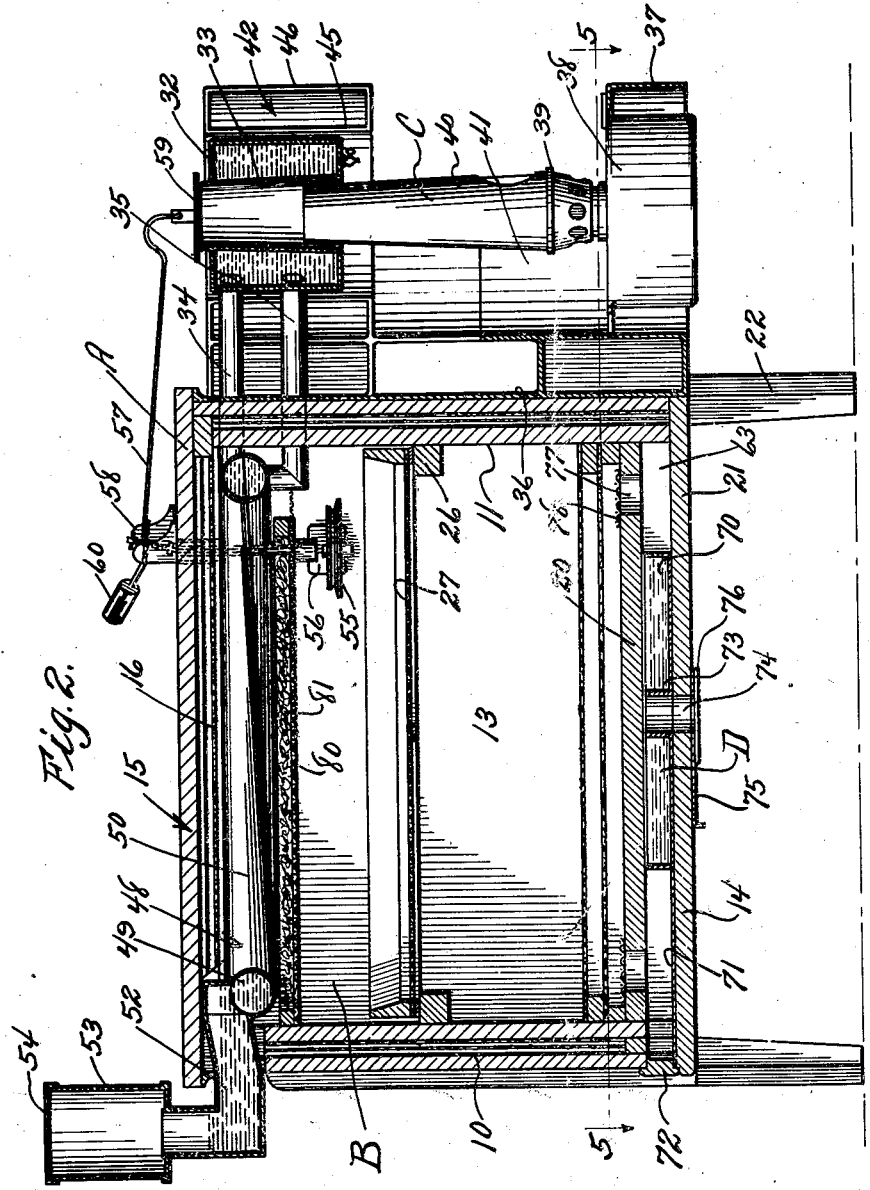
Figure 3:
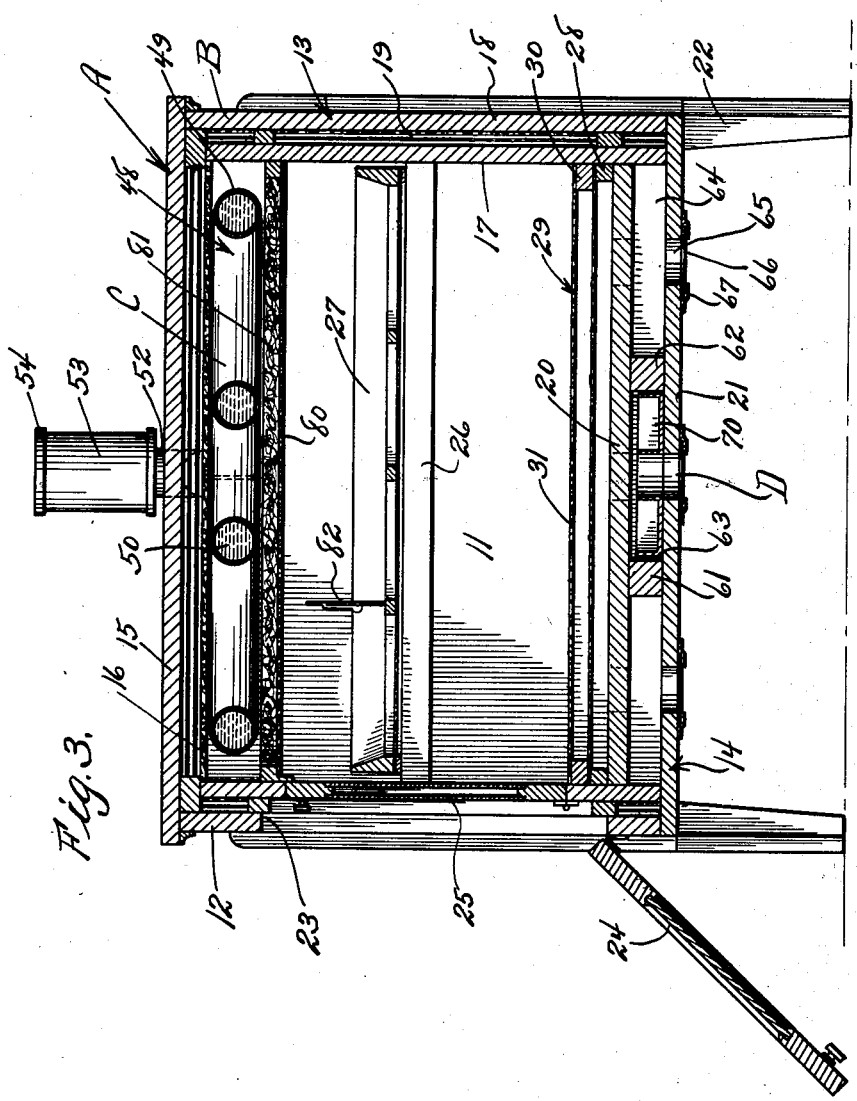
Figure 4:
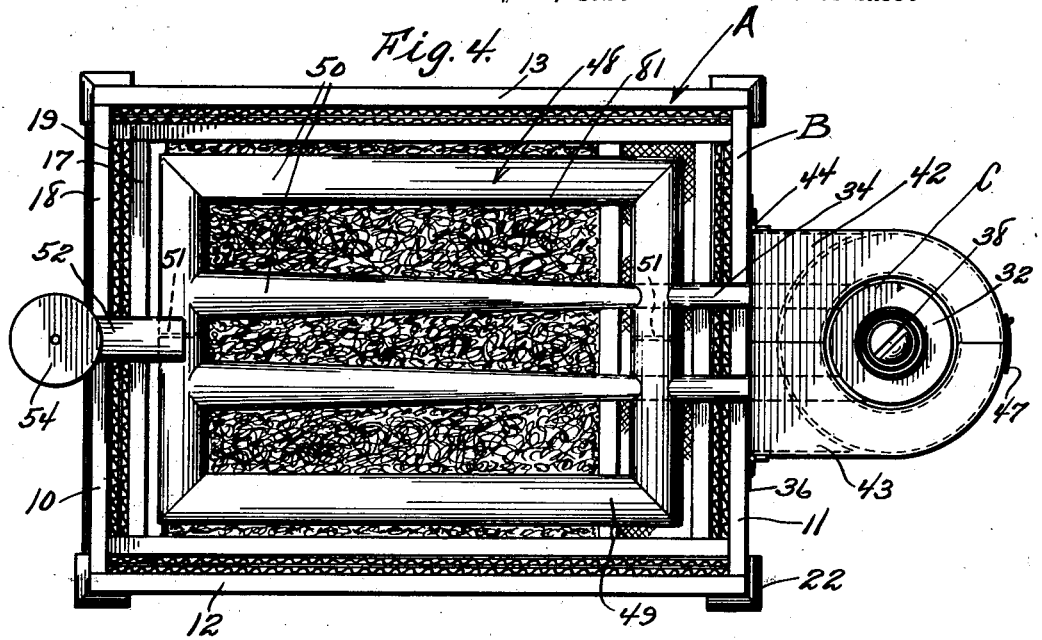
Figure 5:
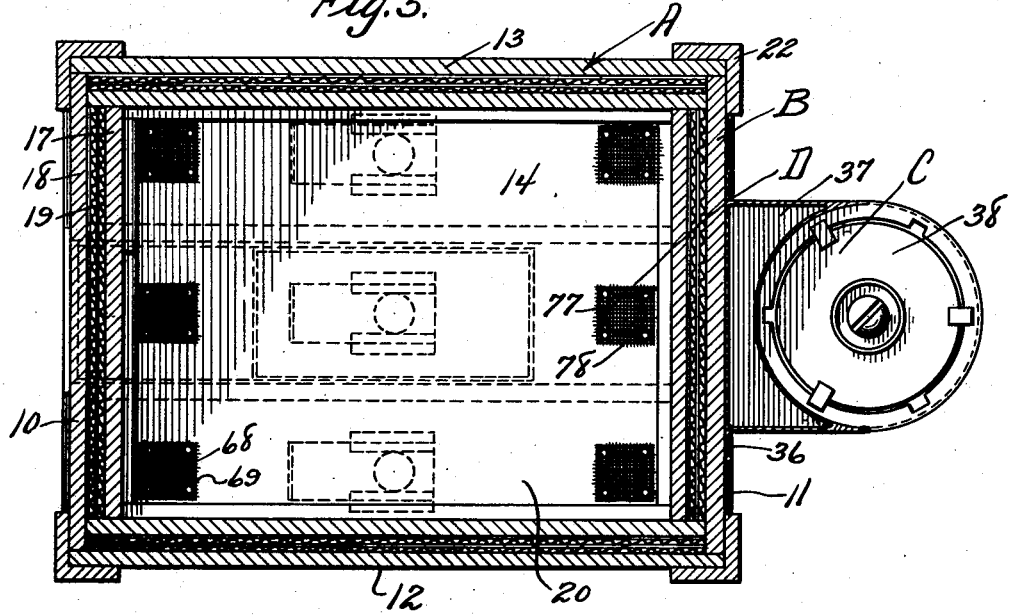

With these and other objects in view, the invention consists in the novel construction, arrangement and formation of parts, as will be hereinafter described more specifically, claimed, and illustrated in the accompanying drawings, in which drawings:

Figure 1 is a perspective view of my improved incubator,

Figure 2 is a central longitudinal section through the incubator taken on the plane indicated by the line 2—2 in Figure 1 of the drawings, Figure 3 is a central transverse section taken through the incubator on the plane indicated by the line 3—3 in Figure 1 of the drawings, Figure 4 is a top plan view of the incubator with the removable cover detached therefrom illustrating the arrangement of the novel radiators in the upper end of the body of the incubator, and Figure 5 is a horizontal section through the incubator taken on the plane indicated by the line 5—5 in Figure 2 of the drawings.

Referring to the drawings in detail, wherein similar reference characters designate corresponding parts throughout the several views, the letter "A" generally indicates the improved incubator, which comprises the body "B"; the novel heating means "C," and the novel ventilating and moisture supplying means "D."

The body "B" can be of any preferred size for incubating the desired number of eggs and may contain one or more egg trays. As shown the body "B" includes the end walls 10 and 11, the front wall 12, the rear wall 13, the bottom wall 14, and the top wall 15. The top wall 15 is preferably detachably associated with the front, rear, and end walls, in order that the entire upper end of the body can be laid bare when so desired and this top wall preferably includes a number of stepped boards 16 in order to snugly fit the said front, and bottom wall. It is also preferred to have two of the boards held in spaced relation so that suitable packing can be placed therebetween to form a dead air space.

The front, rear, end, and bottom walls each include inner and outer skins 17 and 18 and the skins of the end, front and rear walls receive suitable packing therebetween in order to form a dead air space. This packing can be of suitable corrugated fiber board 19 if so desired. The inner and outer skins of the bottom wall are spaced a relatively greater distance apart than are indicated by the reference characters 20 and 21, for a purpose, which will be hereinafter more fully described. The body portion "B" can be supported on suitable corner legs 22 if so desired.

The front wall 12 is provided with an enlarged entrance opening 23 and an outer and inner door 24 and 25 is provided for closing the said opening. As shown these doors are arranged in spaced relation relative to one another and the outer door is formed wholly of opaque material, while the inner door is provided with spaced panels of translucent material in order that the interior of the incubator can readily be seen without the necessity of opening the said inner door and subjecting the eggs to a cold draft. I make the outer door wholly of opaque material in order to normally keep light from entering the body. Suitable transversely extending cleats 26 are carried by the end walls 10 and 11 at a point intermediate the top and bottom of the body for receiving any preferred type of egg tray 27. This egg tray 27 is adapted to be slid into the body on the cleats through the door opening 23. This egg tray can be of any desired material.

The lower wall 20 also supports a pair of transversely extending cleats 28 on which is adapted to rest a nursery tray 29. This nursery tray 29 consists of an open rectangular frame 30 which supports upper and lower sheets of fabric 31. This tray also performs another function, as will be hereinafter more fully brought out.

The heating means "C" embodies a hot-water boiler 32 having a central tapered flue 33 extending axially therethrough. This boiler can be held in place in any desired way and as shown the same is held in place by a pair of upper hot-water pipes 34, and a pair of lower return pipes 35.

As shown, the boiler 32 is arranged adjacent to the end wall 11 of the body "B", and the outer surface of this end wall is covered with a sheet of metal 36 in order to protect the same from fire. An annular bracket 37 is disposed adjacent to the lower end of the end wall 36 and receives the font of any preferred type of heating lamp 39. The burner of the lamp is provided with an elongated tapered chimney 40 which extends into the flue 33 of the boiler 32. The lamp supporting bracket 37 is provided with an arcuate sheet metal guard 41 which terminates above the burner portion of the said heating lamp.

A pair of companion guards 42 and 43 are provided for extending about the boiler 32, and these companion guards are hinged as at 44 to the metal protector 36. The guards are formed of sheet metal and include inner and outer spaced walls 45 and 46. The guards are so hinged, that the same can extend about and on the opposite sides of the boiler, and when the guards are in their operative position the same are prevented from accidental opening movement by a suitable catch 47. These guards serve a triple function. First, for preventing cold air from coming into contact with the boiler; second, for protecting the body from fire; and third, for permitting the heated air to take a tortuous course around this boiler as will become hereinafter more fully termed as the description proceeds.

The heater "C" also includes a radiator 48 which is arranged within the body "B" adjacent to the upper end thereof. This radiator 48 includes a rectangular-shaped outer pipe 49 and longitudinally extending inner pipes 50 which connect with the ends of the outer pipe. The hot-water pipes 34 which lead from the top of the boiler 32 extend through the end wall 11 and communicate with the end of the outer pipe 49 on each side of the transverse center thereof as clearly shown in figure 4 of the drawings. The return pipes 35 also extend through the end wall 11 and communicate with the lower face of the outer pipe 49. It is preferred to divide the radiator 48 into two sections and a suitable partition 51 is placed intermediate center front and center back of the outer pipe 49 as shown in Figure 4. By referring to Figures 2 and 4 it can be seen that pipes 34 and pipes 50 are continuous leading to the top of the boiler 32 and extending through the front end of the outer pipe 49 longitudinally through the incubator and connected with the back end of the outer pipe 49. As water becomes heated the same flows through pipe 34, through the tapered pipe 50 to the further end to the return pipes 35 back to the lower end of the boiler, where the water will become re-heated from the lamp. The lower end of the boiler can be provided with any preferred type of drain cock in order to permit the draining of the water from the system. The end of the outer pipe 49 remote from the boiler 50 is provided with a lateral extension 52 which terminates in an elongated head 53 which extends above the body portion of the incubator. This head 53 is provided with a removable cap 54 in order to permit the filling up of the system with water when necessary or desirable. As shown, the lateral extension 52 connects with the longitudinal center of the outer pipe 49 and water is permitted to flow into and out of said extension into the outer pipe 49 on each side of the partition 51. A suitable air opening is formed in the cap 54 in order to allow the escape of air and vapor from the radiator.

In order to keep the incubator at an even temperature I arrange a thermostat of the double wafer type 55 in the body "B" directly above the egg tray 27 and this thermostat has connected with the upper end thereof an operating rod 56 which extends through the top wall 15 of the body "B". A lever 57 is pivotally mounted at a point adjacent to one end and a suitable bracket 58 carried by the upper wall 15 of the body and the outer end of the lever carries a damper 59 which rests directly above the flue 33. The opposite end of the lever has connected thereto a suitable weight 60 which can be adjusted toward and away from the pivot point of the lever as may be desired. The operating rod 56 is operatively connected with the lever rod 57 at a point forwardly of the pivot point thereof and it is obvious that upon expansion of the thermostat the lever 57 will be operated to raise the damper 59 above the flue and thus permit the heated air to escape directly to the atmosphere. When the thermostat contracts, it can be seen that the damper will rest on top of the flue and thus close the flue opening. The heated air will now flow into the flue and then out from the bottom thereof between the chimney and the lower end of the flue, and then up between the outer surface of the boiler and the inner surface of the guards 42 and 43. It thus can be seen that these guards permit the heat to take a tortuous course, whereby the maximum amount of benefit will be obtained from it.

In order to permit a thorough ventilation of the incubator to be had I arrange longitudinally extending partition plates 61 and 62 in the lower wall 14 between the inner and outer skins 20 and 21 thereof which forms an intermediate chamber 63 and side chambers 64 in the said bottom wall. The chambers 64 have communicating therewith air openings 65 adjacent to the center thereof and these openings are formed directly in the outer skin 21. The active size of these openings can be controlled by suitable slide valves 66 which are mounted in the guide ways 67 carried by the lower wall. The side chambers 64 have also communicating therewith and adjacent to the opposite ends thereof outlet openings 68 which are formed in the inner skin 20. It can be seen that the air will flow into the chambers in the central portion thereof and then flow into the incubator body from the ends of the chambers. It is prefered to cover the said openings 68 with suitable fabric 69.

One of the important features of my invention is to provide means for humidifying the interior of the body, and in order to accomplish this I provide a water tray 70 which is mounted upon a slide plate 71. This slide plate 71 has its outer end provided with a pull 72 which extends out through the end wall 10 of the body. It is obvious that the water tray 70 can be pulled out from the casing or chamber 63 in order that the said tray can be filled with water. The tray has formed in the center thereof an upstanding cuff 73 and this cuff 73 is adapted to communicate with an opening 74 formed in the outer skin 21 of the bottom wall 14 when the tray is in its operative position in the said chamber 63. The active size of the opening 74 is adapted to be controlled by a slide valve 75 which is mounted within a suitable guide way 76.

The opposite ends of the chamber 63 have communicating therewith outlet openings 77 which connect the ends of the chamber with the body of the incubator. These openings 77 are preferably covered by suitable sheets of fabric 78.

Now it can be seen that as air enters the opening 74 the same will flow into the cuff 73 and then over the surface of the water in the tray 70 and the air will pick up moisture as the same flows over the tray. This air will then flow through the openings 77 into the incubator and thus effectively humidify the air. It is obvious that the amount of air flowing into the incubator can be governed by the said slide valve 75.

From the foregoing description it can be seen that I have provided an improved incubator, in which means is provided for evenly heating the incubator in a novel and expeditious manner, and novel means for ventilating and humidifying the body of the incubator.

Located directly beneath the radiator 48 is a screen 80 preferably formed of wire mesh and adapted to have distributed thereon a suitable air current retarding substance 81. This substance 81 acts to prevent the air current passing through the incubator from traveling too rapidly.

The air that enters the incubator through opening 74 leaves the incubator through the opening around the filling pipe 52.

Any preferred type of thermometer 82 can be associated with the egg tray 27 so that the temperature of the interior of the incubator can be determined.

Changes in detail may be made without departing from the spirit or the scope of this invention, but what I claim as new is:

1. In an incubator, the combination with a body having an egg compartment therein and a lower wall including spaced inner and outer plates, longitudinally extending partitions disposed between the plates forming a centrally disposed chamber and side chambers, the side chambers having air inlet and air outlet openings formed therein, a water tray arranged within the central chamber having a flue therethrough, the lower plate having an opening communicating with the flue, the inner plate having openings communicating with the opposite ends of the central chamber all and for the purpose specified.

2. In an incubator, a body having an egg compartment therein and a lower wall including inner and outer spaced plates, partitions arranged between said plates defining a central and side compartments, means for ventilating the egg chamber from the side compartments, a plate slidably mounted within the central chamber, a water tray arranged on said slidable plate having a flue therethrough, the lower plate of the bottom wall having an opening formed therein adjacent to its transverse center communicating with said flue, and the upper plate having air outlet openings formed therein adjacent to the opposite ends thereof communicating with the terminals of the central chamber, as and for the purpose specified.

In testimony whereof I affix my signature.

AARON A. SCOTT.